ANTI-SKATE DEVICE

Filed Dec. 5, 1961

INVENTOR.
FRANK T. SCALERA
BY Amster & Levy
ATTORNEYS

United States Patent Office 3,189,352
Patented June 15, 1965

3,189,352

ANTI-SKATE DEVICE

Frank T. Scalera, Maplewood, N.J., assignor, by mesne assignments, to General Electric Company, a corporation of New York Filed Dec. 5, 1961, Ser. No. 157,226
8 Claims. (Cl. 274—10)

The present invention relates generally to automatic phonograph changers, and in particular to an anti-skate device for the tone arm thereof which is effective to prevent the often encountered erratic movement of the tone arm across the surface of a record immediately after the tone arm has been lowered onto the record.

The employment of automatic record changing phonograph mechanisms has become extremely wide spread and a number of differing, but highly successful changing mechanisms have been used. However, many problems still exist in the development of the ultimate record changer. The present invention is addressed to a solution for one of these problems, namely the propensity of a phonograph tone arm to skate inwardly across the surface of a record on the turntable immediately after the tone arm has been lowered onto the record. This inward movement, is caused by a number of factors. A phonograph tone arm, of necessity must be mounted for relatively free horizontal motion about a vertical axis such that the stylus at the end of the tone arm will easily track within the grooves of the record. Thus, prior to the time that a tone arm is firmly stabilized in its spiral path by the interengagement of the phonograph stylus with the grooves of the record, relatively small forces may be effective to produce large horizontal swinging movements of the tone arm. The geometries employed in virtually all phonographs, by their very nature, produce forces on the tone arm normally urging it inwardly toward the center of the turntable. The nature of these forces will be appreciated by considering the following: As the tone arm and tone arm stylus are lowered into contact with the upper surface of a phonograph record rotating in a clockwise direction, there is a relative motion between the surface of the record and the stylus which is directed along a line through the contact point of the stylus and perpendicular to the radius of the record. If this perpendicular line passed through the vertical axis of the tone arm, no inward swinging force would be exerted onto the tone arm. However, this perpendicular line, the line of direction of motion of the record at the point of contact between the record and the tone arm stylus, is at an angle to the line between the verticaly swinging axis of the tone arm and the stylus. Thus, a drag force is applied to the stylus which force has a component of motion in an inward direction. This component of motion produces an inwardly directed force upon the tone arm which tends to make the tone arm travel inwardly across the surface of the record toward the spindle of the turntable.

A second and usually more signigcant inwardly directed force acts upon the tone arm as an additional result of the relative motion between the rotating record and the stylus. This force is created by the inward movement, relative to the stylus, of the spiral grooves in the record. The grooves at the edge of the record spiral inwardly at a relatively high rate, commonly called the lead-in grooves, which rate decreases to the substantially uniform relative spiraling rate found in the information-containing portion of the record. When the tone arm is lowered onto the lead-in groove portion of the record, the inward rate of travel of the groove is relatively high. If the tone arm is given a sudden inward impetus, as by quick engagement with the high inward spiral of the lead-in groove, and the stylus does not become immediately stabilized within the groove, the undamped tone arm may continue its fast inward movement and may then skate across the surface of the phonograph thereby creating objectionable noises from the phonograph and seriously damaging both the stylus and the record.

Accordingly, it is an object of the present invention to provide an anti-skate device which will eliminate the aforementioned disadvantages. Specifically, it is an object of the present invention to provide an anti-skate device for a record changer which will oppose erratic inward movement of a tone arm when the tone arm is automatically set down in the lead-in groove of a rotating record.

It is a further object of the present invention to provide anti-skate means for record changers which will improve their operating characteristics and which will minimize the possibility of harmful effect upon the phonograph stylus and upon records played upon the changer.

In accordance with one illustrative embodiment of the present invention there is provided an automatic record changer including a chassis, a turntable, a tone arm mounted for horizontal movement about a vertical axis and an automatic changing mechanism to deliver successive records to the phonograph turntable and to lower the tone arm onto each successive record. Within this environment there is provided an anti-skate device comprising a first member which is secured to the movable tone arm and is horizontally movable therewith about the vertical axis of that tone arm, and a second member fixed relative to the horizontal motion of the tone arm and the first member, and which is selectively movable into and out of engagement with the first member. Activating means for the anti-skate device are provided to move the said two members into interengagement during that portion of the record-changing cycle wherein the tone arm is lowered into contact with a record on the phonograph turntable and to disengage the two members to allow free movement of the tone arm during the record playing portion of the changing cycle.

The above brief description, as well as further objects, features and advantages of the present invention, will be best appreciated by reference to the following detailed descritpion of a presently preferred embodiment when taken in conjunction with the accompanying drawings wherein.

Figure 1:
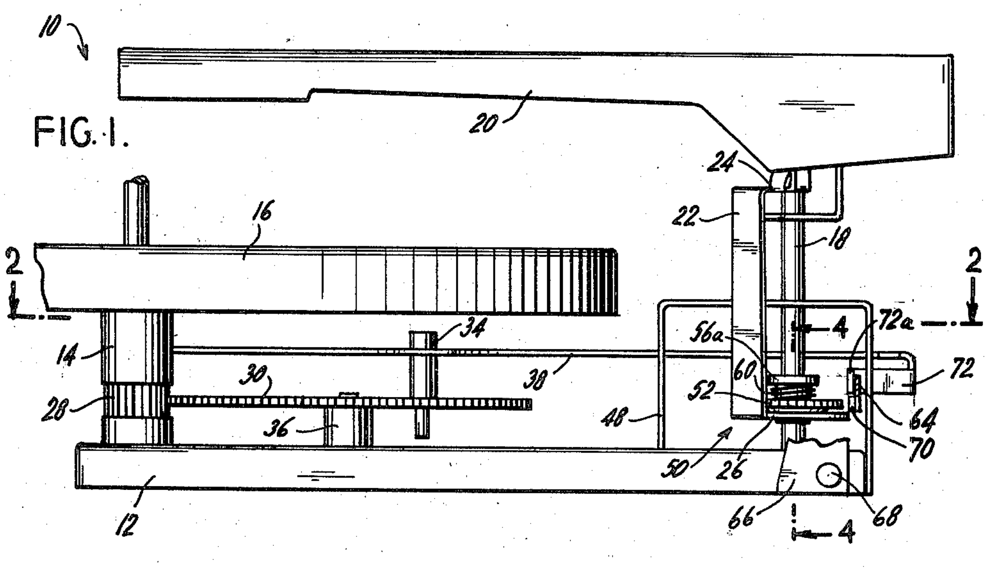
FIG. 1 is an elevational view of a portion of an automatic phonograph changer incorporating an anti-skate device according to the present invention.

Referring now specifically to the drawings there is shown in FIG. 1 a portion of an automatic record changer, generally designated by the numeral 10. The changer 10 includes a main chassis 12 on which is mounted the rotatable collar 14 secured to the turntable 16. There is also mounted on the chassis 12 a fixed tone arm mounting shaft 18 on which is mounted the tone arm 20. The tone arm 20 is mounted upon the vertical shaft 18 by means of a mounting yoke 22 which has an upper right angle extension 24 which is engaged about the upper portion of the shaft 18 and a lower right angle extension 26 which is similarly engaged by the lower portion of the shaft 18. A cross member on the yoke 22, a portion of which is seen in FIG. 1, engages the top of the shaft 18 such that the yoke 22 is rotatable about the shaft 18 about the right angle extensions 24, 26 and is supported against downward movement along the shaft 18 by its engagement with the upper end of the shaft 18. The tone arm 20 is mounted for pivotal motion about a horizontal axis on the yoke 22. Thus, the tone arm 20 may be moved vertically with respect to the yoke 22 and may be moved also through a horizontal traverse, about the axis of the shaft 18. The specific constructions of the tone arm mounting means are more fully detailed in my copending application, entitled Tone Arm Mounting Assembly, Serial No. 185,696, now U.S. Patent No. 3,163,429.

The turntable 16 and the rotating column 14 are driven through clockwise movement (as seen from above) by means of a motor and idler wheel (not shown) which engages the downwardly extending flange of the turntable 16 as is well known in the art. The changing mechanisms of the automatic phonograph 10 are activated through the gear teeth 28 formed in the rotating column 14 which are selectively engageable with the main drive gear 30. Matching gear teeth are provided on the periphery of the main drive gear 30 and, as may be seen in FIG. 2, a cut out portion 32 is provided in the periphery of the main drive gear 30 to deactivate the main drive gear 30 during the record playing portion of the changing cycle. Rigidly connected to and extending upwardly from the main drive gear 30 is a changing mechanism activating pin 34 which is spaced radially outwardly from the center post 36 of the main drive gear 30, such that the pin 34 traces a circular path as the main drive gear 30 rotates about its central axis. The pin 34 is engaged with the changer slide 38 within the slot 40. It will be appreciated that as the main drive gear 30 is rotated and as the pin 34 is driven through its circular path, the engagement of the pin 34 with the slot 40 of the slide 38 will cause the slide 38 to reciprocate to the left and right as shown in the drawings. The slide 38 is mounted on the chassis 12 at one end by a pin 42 secured to the chassis which is received within a slot 44 in the slide 38 and at the other end by an extension 46 of the slide 38 which is received within upright guiding members 48.

Figure 2:
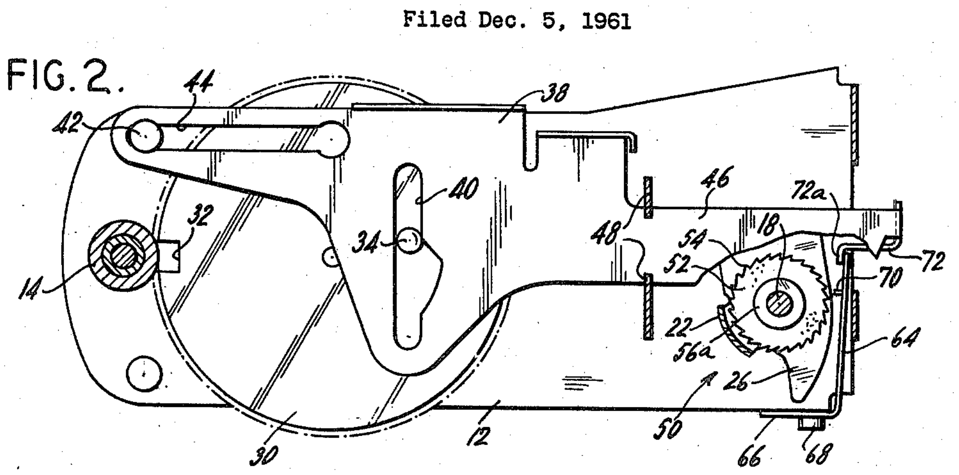
FIG. 2 is a sectional view taken along the line 2—2 of FIG. 1 looking in the direction of the arrows illustrating the anti-skate device in its inactive, tone arm-free position.
Figure 3:
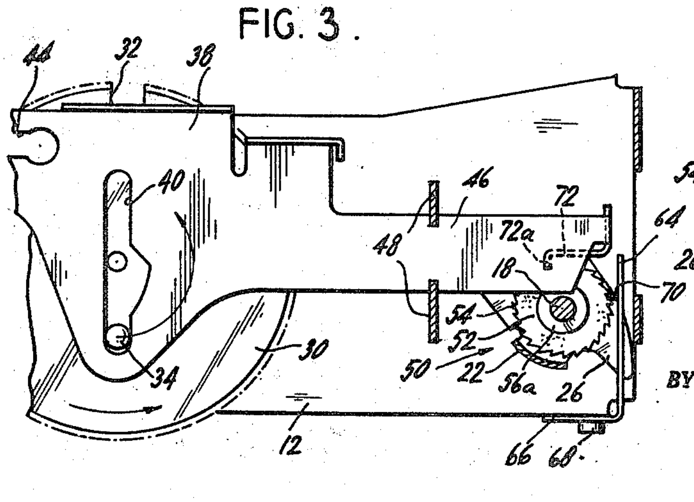
FIG. 3 is a partial view similar to that of FIG. 2 illustrating the anti-skate device in its active, tone arm-restraining position.

The slide 38 is the actuating mechainsm for a variety of different operations during the course of the changing cycle in the automatic phonograph 10. As the main guide wheel 30 is rotated in counter clockwise direction, as seen in FIG. 2, the slide 38 will be driven toward the left until the drive gear 30 has been rotated through 180°. A further rotation of 90° brings the various component parts into the position which is illustrated in FIG. 3, and a further rotation of 90° returns the components to their positions as illustrated in FIG. 2. Of course, FIG. 2 illustrates the position of the various mechanisms when the phonograph is in its record playing position and the position illustrated in FIG. 3 is that which is assumed by the various mechanisms during that portion of the record changing cycle wherein the tone arm 20 is lowered onto a record positioned on the turntable 16.

Figure 4:
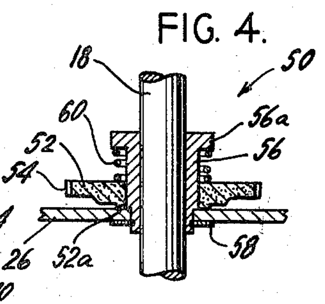
FIG. 4 is an enlarged sectional view taken along the line 4—4 of FIG. 1 looking in the direction of the arrows.

The anti-skate device, generally designated by the numeral 50, is secured to the tone arm mounting yoke 22 and the chassis 12 in the vicinity of the tone arm mounting yoke. The anti-skate device 50 includes a first member 52 which, in this present embodiment, is in the shape of a disc having a plurality of teeth 54 formed on its outer surface. The disc 52 is mounted for frictional engagement with the bottom perpendicular extensions 26 of the tone arm mounting yoke 22 and is positioned about a mounting and bearing element 56, which in turn is mounted for rotation about the fixed shaft 18. As may be best seen in FIG. 4, the mounting and bearing elements 56 are secured to the tone arm mounting yoke 22 at the extension 26 by means of a retaining ring 58. A shoulder 56*a* is formed at its upper end and a spring 60 is positioned between the shoulder 56*a* and the first anti-skate member or disc 52. The spring 56 is effective to create a firm frictional interengagement between the first member 52 and the mounting yoke 22. In order to insure the desired amount of frictional contact between these two parts, a shoulder 52*a* of predetermined area is formed on the lower surface of the disc 52 for positive engagement with the extension 26 of the mounting yoke 22. It will be appreciated that as the tone arm 20 is rotated about the fixed shaft 18, the first element or disc 52 will similarly be rotated about the shaft 18 due to the frictional engagement with the mounting yoke 22. It will be further appreciated that the motion of the tone arm 20 will be inhibited if an external force is applied to the first element 52 to prevent its rotation about the shaft 18.

The anti-skate device 50 further includes a second member or engagement pawl which is mounted on the chassis 12 and is movable into and out of engagement with the teeth 54 on the outer periphery of the first member 52. As may be best seen in FIGS. 1 and either 2 or 3, the engagement pawl 64 comprises a horizontally disposed spring member which is mounted by the pawl mounting bracket 66 which, in this illustrative embodiment, is integrally formed with the engagement pawl 64. The mounting bracket 66 may be conveniently secured to the chassis 12 by means such as the rivet 68. Extending inwardly, toward the fixed shaft 18 and toward the tooth wheel 52, is a contact member 70 which may be struck from the body of the engagement pawl 64. It is the contact finger 70 which engages with the teeth 54 on the toothed wheel 52 to resist motion of the tone arm 20 about the shaft 18. The pawl 65 itself is formed of a flexible material such that it may be moved out of engagement with the tooth wheel 52 (see FIG. 2) an interengagement therewith (see FIG. 3).

The activation and deactivation means for the engagement pawl 64 comprises an extension 72 formed on the rearward end of the slide 38. The extension 72 has a pawl-contacting end 72*a* which is located at the height of the engagement pawl 64. As described above, the slide 38 is at its rearwardmost position (furthest to the right in the drawings herein) during the record playing portion of the phonograph changing cycle. It is during this portion of the cycle that the anti-skate device 50 must be disengaged thereby to allow free movement of the tone arm 20. As may be seen in FIG. 2, during this portion of the changing cycle, the extension 72 of the slide 38 is effective to engage one end of the engagement pawl 64 moving the contact finger 70 away from the toothed wheel 52, thus deactivating the anti-skate device 50.

It is during the record changing portion of the phonograph cycle, and particularly during that portion of the record changing cycle wherein the tone arm is lowered onto a record, that the anti-skate device 50 is activated. When the changing cycle commences and the slide 38 is moved toward the left, the extension 72 of the slide similarly moves toward the left thus allowing the engagement pawl 64 to spring into engagement with the toothed wheel 52. The engagement pawl 64, and specifically the contact finger 70, is then effective to halt rotation of the toothed wheel 52 which in turn inhibits rotation of the mounting yoke 22 and the tone arm 20. Of course, because the interconnection of the toothed wheel 72 to the mounting yoke 22 is one of frictional contact, the tone arm may nevertheless be moved with respect to the toothed wheel 52 thereby permitting it to be transported through the normal changing operation. However, the frictional interengagement of the wheel 52 and the mounting yoke 22 is such that the relatively small forces which might tend to make the tone arm 20 skip across the surface of the record become insufficient as compared to the friction in the anti-skate device 50 and, therefore, the undesirable skating effect is eliminated. Of course, as the slide 38 is moved toward the right (see FIG. 3), the extension 72 once again contacts the far end of the engagement pawl 64 pulling the finger 70 out of engagement with the wheel 52 thereby deactivating the anti-skate device 50.

In order to convey a more complete understanding of the above described invention, a sequence of operations of the anti-skate device 50 will be described. At the compeltion of the record playing portion of the changer cycle the changing mechanism is activated and the main drive wheel 30 begins its counterclockwise rotation which is effective to drive the slide 38 toward the left. As the slide 38 moves toward the left, the extension 72 of the slide 38 releases one of the interengaging members of the anti-skate device 50, in this case the pawl 64, such that the contact finger 70 is engaged with one of the teeth 54 on the first anti-skate member or toothed wheel 52. The frictional interengagement of the toothed wheel 52 with the tone arm 20, through the mounting yoke 22, is effective to provide a drag force opposing any motion of the tone arm 20 in a horizontal plane about the shaft 18. However, this drag force may be overcome by the relatively strong forces applied to the tone arm 20 by the changing mechanism during the changing cycle. When the tone arm 20 is moved over the outer edge of the record and lowered thereon by the changing mechanism, the slide 38 and the main drive gear 30 are approximately in the position shown in FIG. 3. It will be noted that the extension 72 of the slide 38 has not yet become engaged with the engagement pawl 64 and, therefore, the anti-skate mechanism 50 is still in its active position. Thus, there will be firm frictional opposition to any transverse forces applied to the tone arm 20 as it contacts a record on the turntable 16 thereby preventing the undesirable tone arm skating effect. When the slide 38 moves to its furthest position (see FIG. 2) as the phonograph changer 10 enters the record playing portion of its cycle, the extension 72 of the slide 38 engages the end of the engagement pawl 64 to remove the contact finger 70 away from the wheel 52 thereby to deactivate the anti-skate device 50 and allow the free movement of the tone arm 20 across the record as guided by the spiralling record grooves.

It will be appreciated that there is provided in accordance with the present invention a device for use with record turntables and tone arms of all kinds which effectively provides a drag force upon the tone arm as the tone arm is lowered onto a record such that the tone arm will not skate across the surface of a record prior to the time that the tone arm stylus has reached an equilibrium position within one of the grooves of a phonograph record. The anti-skate device according to the present invention may be activated from the automatic changing mechanisms of an automatic record changing phonograph such that it is activated during that portion of a changing cycle wherein the tone arm is set down upon a record and then deactivated to allow free tone arm movement during the record playing portion of the changer cycle.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. In an automatic phonograph changer having a chassis and a turntable supported thereon, a tone arm, means including a shaft extending vertically from said chassis to mount said tone arm for horizontal movement about a vertical axis, automatic record changing means supported upon said chassis for depositing individual records on said turntable and for placing the outer end of said tone arm onto the outer edge of each record after it is placed on said turntable, an anti-skate device for preventing said tone arm from skating across a record when said tone arm is set down upon the record, said device comprising a first member frictionally secured for horizontal rotation about said vertical shaft in response to movement of said tone arm, a second member mounted on said chassis and movable into and out of engagement with said first member for selectively inhibiting rotation of said first member thereby frictionally opposing horizontal movement of said tone arm about said vertical shaft, and anti-skate activating means connected to and operable from said automatic record changing means and engagebale with said second member for moving said second member into engagement with said first member during the portion of the changing cycle of said automatic phonograph wherein said tone arm is lowered onto a record.

2. In an automatic phonograph changer having a chassis and a turntable supported thereon, a tone arm, means including a shaft extending vertically from said chassis to mount said tone arm for horizontal movement about a vertical axis, automatic record changing means supported upon said chassis for depositing individual records on said turntable and for placing the outer end of said tone arm onto the outer edge of each record after it is placed on said turntable, an anti-skate device for preventing said tone arm from skating across a record when said tone arm is set down upon the record, said device comprising a toothed wheel frictionally secured for horizontal rotation about said vertical shaft in response to movement of said tone arm, an engagement pawl mounted on said chassis and moveable into and out of engagement with said toothed wheel for selectively inhibiting rotation of said toothed wheel thereby frictionally opposing horizontal movement of said tone arm about said vertical shaft, an anti-skate activating means connected to and operable from said automatic record changing means and engageable with said engagement pawl for moving said engagement pawl into engagement with said toothed wheel during the portion of the changing cycle of said automatic phonograph wherein said tone arm is lowered onto a record.

3. In an automatic phonograph changer having a chassis and a turntable supported thereon, a tone arm, means including a shaft extending vertically from said chassis to mount said tone arm for horizontal movement about a vertical axis, automatic record changing means supported upon said chassis for depositing individual records on said turntable and for placing the outer end of said tone arm onto the outer edge of each record after it is placed on said turntable, an anti-skate device for preventing said tone arm from skating across a record when said tone arm is set down upon the record, said device comprising a first member frictionally secured for horizontal rotation about said vertical shaft in response to movement of said tone arm, a second member mounted on said chassis and movable into and out of engagement with said first member, and anti-skate activating means connected to and operable from said automatic record changing means for moving said second member into engagement with said first member during the portion of the changing cycle of said automatic phonograph wherein said tone arm is lowered onto a record, wherein engagement of said first and said second member introduces a friction drag between said tone arm and said chassis through said anti-skate device, the friction drag being in opposition to horizontal movement of said tone arm.

4. In combination with an automatic phonograph changer and a tone arm mounted in said changer for horizontal movement about a vertical shaft, an anti-skate device for preventing said tone arm from skating across the surface of a record when said tone arm is lowered thereon during the change cycle of said phonograph comprising, a movable member frictionally secured for horizontal rotation about said vertical shaft in response to horizontal movement of said tone arm, activating means in said automatic phonograph changer for selectively engaging and disengaging said stationary member and said movable member, said activating means engaging said stationary member with said movable member during the portion of the change cycle of said phonograph when said tone arm is lowered onto a record thereby introducing a friction drag opposing horizontal movement of said tone arm about said vertical shaft.

5. In combination with an automatic phonograph changer and a tone arm mounted in said changer for horizontal movement about a vertical shaft, an anti-skate device comprising a rotatable member frictionally secured to said tone arm for horizontal rotation with said tone arm about said vertical shaft, said rotatable member being movable with respect to said tone arm against the frictional force between said tone arm and said rotatable member, an engagement arm fixedly mounted with respect to movement of said tone arm about said vertical shaft and being selectively movable into and out of engagement with said rotatable member for preventing said rotatable member from rotating about said vertical shaft, an activating means in said automatic phonograph changer for moving said engagement arm out of engagement with said rotatable member during portions of the change cycle of said phonograph and for moving said engagement arm into engagement with said rotatable member during the portion of said cycle when said tone arm is lowered onto a record thereby imposing a friction drag on said tone arm preventing said tone arm from skating across the surface of the record.

6. An anti-skate device for use with a horizontally rotatable tone arm comprising, a first member frictionally secured to and horizontally rotatable with the tone arm, said first member movable with respect to the tone arm against the force of friction between said movable member and the tone arm, a second member fixed with respect to rotation of the tone arm, said first and second members being selectively interengageable for selectively introducing a frictional force resisting horizontal rotation of the tone arm, and selective activation means for effecting interengagement of said first and second members.

7. An anti-skate device for use with the horizontally rotatable tone arm of an automatic phonograph changer mechanism comprising a first member in frictional engagement with the tone arm such that it can rotate with the tone arm, a second member secured to a fixed point on the automatic phonograph changer and adapted to engage said first member to inhibit rotation thereof, means connected to the record changer mechanism for effecting engagement of said second member with said first member during a selected portion of the operation of the phonograph changer.

8. In an automatic phonograph having a chassis and a turntable supported thereon, a tone arm, means including a shaft extending vertically from said chassis to mount said tone arm for horizontal movement about a vertical axis, an automatic record changing element, an anti-skate device for preventing said tone arm from skating across a record when said tone arm is set down upon the record comprising a first member frictionally secured for horizontal rotation about said vertical shaft in response to movement of said tone arm, a second member mounted on said chassis and movable into and out of engagement with said first member for selectively inhibiting rotation of said first member thereby frictionally opposing horizontal movement of said tone arm about said vertical shaft, and anti-skate activating means connected to and operable from said automatic record changing element and engageable with said second member for moving said second member into engagement with said first member during the portion of the changing cycle of an automatic phonograph wherein said tone arm is lowered onto a record.

References Cited by the Examiner

UNITED STATES PATENTS

| | | | |
|---|---|---|---|
| 1,711,680 | 5/29 | Holland | 274—30 |
| 1,866,403 | 7/32 | Elmer. | |
| 2,239,359 | 4/41 | Banning | 244—23 |
| 2,331,122 | 10/43 | Jones | 274—1 |
| 2,962,289 | 11/60 | Greene | 274—23 X |

LOUIS J. CAPOZI, *Primary Examiner.*

ALDRICH F. MEDBERY, *Examiner.*